United States Patent [19]
Evans

[11] Patent Number: 4,991,438
[45] Date of Patent: Feb. 12, 1991

[54] MAGNETIC FLUID REBALANCE ACCELEROMETERS

[75] Inventor: Kenneth S. Evans, Cheltenham, England

[73] Assignee: Baroid Technology, Inc., Houston, Tex.

[21] Appl. No.: 318,237

[22] Filed: Mar. 3, 1989

[30] Foreign Application Priority Data

Mar. 15, 1988 [GB] United Kingdom ............... 8806113

[51] Int. Cl.$^5$ ............................................. G01P 15/13
[52] U.S. Cl. ................................ 73/516 R; 73/517 B
[58] Field of Search ......................... 73/516 R, 517 B

[56] References Cited

U.S. PATENT DOCUMENTS

| | | | |
|---|---|---|---|
| 3,863,508 | 2/1975 | Scarborough et al. | 73/516 R |
| 4,043,204 | 8/1977 | Hunter et al. | 73/516 R |
| 4,706,498 | 11/1987 | Nemnich et al. | 73/516 R |

FOREIGN PATENT DOCUMENTS 2176615A  4/1986  United Kingdom .

OTHER PUBLICATIONS

R. E. Rosensweig, "The Fascinating Magnetic Fluids," *New Scientist*, 20 Jan. 1966, pp. 146–148.
"Ferrofluids, Physical Properties and Applications," publication of Ferrofluidics Corporation, Nashua, NH, pp. 1–10.

Primary Examiner—John Chapman
Attorney, Agent, or Firm—Browning, Bushman, Anderson & Brookhart

[57] ABSTRACT

An accelerometer comprises a housing defining a chamber, a magnetizable fluid within the chamber, an electrically conductive, hollow cylindrical proof mass suspended within the chamber so as to be displaceble from a null position along a displacement axis by an applied force, and a sensing arrangement including electrodes on the inside wall of the chamber for detecting displacement of the proof mass along the displacement axis and for supplying an electrical signal indicative of the applied force. The proof mass is substantially non-magnetic, and magnets are disposed outside the chamber for magnetizing the magnetizable fluid to cause the proof mass to be suspended within the chamber by the fluid. Since there is no requirement for the proof mass to itself be magnetic as in prior accelerometers, it follows that there is no magnetic interaction between the magnetized particles of the fluid and the proof mass, and thus the effective mass of the proof mass will be substantially unchanged by changes in the distribution of the particles. Restoring coils are provided to restore the proof mass to a null position by inducing current flow in the proof mass.

8 Claims, 2 Drawing Sheets

MAGNETIC FLUID REBALANCE ACCELEROMETERS

BACKGROUND OF THE INVENTION

This invention relates to accelerometers, and is more particularly, but not exclusively, concerned with accelerometers for use in down-hole instrumentation for surveying a borehole.

U.S. Pat. No. 4,047,439 discloses an accelerometer comprising a housing defining a chamber, a magnetizable fluid within the chamber, a permanent magnet magnetically suspended within the chamber by the magnetizable fluid with its poles oriented along a displacement axis and displaceable from a null position along the displacement axis by an applied force, and sensing means for detecting displacement of the permanent magnet along the displacement axis and for supplying an electric signal indicative of the applied force.

Such an accelerometer requires to be calibrated prior to use. However, it is found that the required calibration of the accelerometer can tend to drift under the conditions of high temperature and vibration encountered down-hole, and this can lead to inaccuracy in measurement. It is believed that such drift is caused by changes in the effective mass of the proof mass of the accelerometer due to changes in the distribution of the magnetic particles within the fluid and in the magnetic interaction between these particles and the magnet.

It is an object of the invention to provide a novel form of accelerometer which is capable of improved performance under such conditions.

SUMMARY OF THE INVENTION

According to the present invention, there is provided an accelerometer comprising a housing defining a chamber, a magnetizable fluid within the chamber, a proof mass suspended within the chamber so as to be displaceable from a null position along a displacement axis by an applied force, and sensing means for detecting displacement of the proof mass along the displacement axis and for supplying an electrical signal indicative of the applied force, wherein the proof mass is substantially non-magnetic, and magnet means are disposed outside the chamber for magnetizing the magnetisable fluid to cause the proof mass to be suspended within the chamber by the fluid.

With this arrangement the magnetizable particles within the fluid are magnetized by the magnet means and the resultant magnet interaction of the particles with one another and with the magnet means produces a "magnetic pressure" which tends to center the proof mass within the chamber. Since this "magnetic pressure" effect is caused by interaction between the magnetizable fluid and magnet means outside the chamber, there is no requirement for the proof mass to itself be magnetic as in the prior arrangement. It therefore follows that there is no magnetic interaction between the magnetized particles of the fluid and the proof mass, and thus the effective mass of the proof mass will be substantially unchanged by changes in the distribution of the particles. In other words, the required calibration of the accelerometer will be less prone to drift in operation than the prior accelerometer.

In a preferred embodiment of the invention the proof mass is an electrically conductive hollow cylinder which is open at both ends. The cylinder is preferably thin-walled and of circular cross section.

The sensing means may include an electrode assembly attached to the wall of the chamber and comprising at least two, and preferably three, electrodes spaced apart in the direction of the displacement axis and positioned such that the extent to which the electrodes are overlapped by the proof mass varies in dependence on the displacement of the proof mass from the null position.

The accelerometer advantageously further includes restoring coil means for applying a magnetic field to cause the proof mass to be restored to its null position in response to detection signal from the sensing means.

The magnet means may comprise permanent magnets disposed symmetrically with respect to the displacement axis.

The invention also provides an accelerometer comprising a housing, a proof mass suspended within the housing so as to be displaceable from a null position along a displacement axis by an applied force, and sensing means for detecting displacement of the proof mass along the displacement axis and for supplying an electrical signal indicative of the applied force, wherein the sensing means includes variable capacitance means having a capacitance which varies in response to displacement of the proof mass, oscillator means for supplying the variable capacitance means, and phase sensitive detector means for detecting variation in the phase of the output of the variable capacitance means caused by displacement of the proof mass.

BRIEF DESCRIPTION OF THE DRAWING

In order that the invention may be more fully understood, a preferred accelerometer in accordance with the invention will now be described, by way of example, with reference to the accompanying drawings, in which.

DETAILED DESCRIPTION OF THE DRAWINGS

Figure 1:
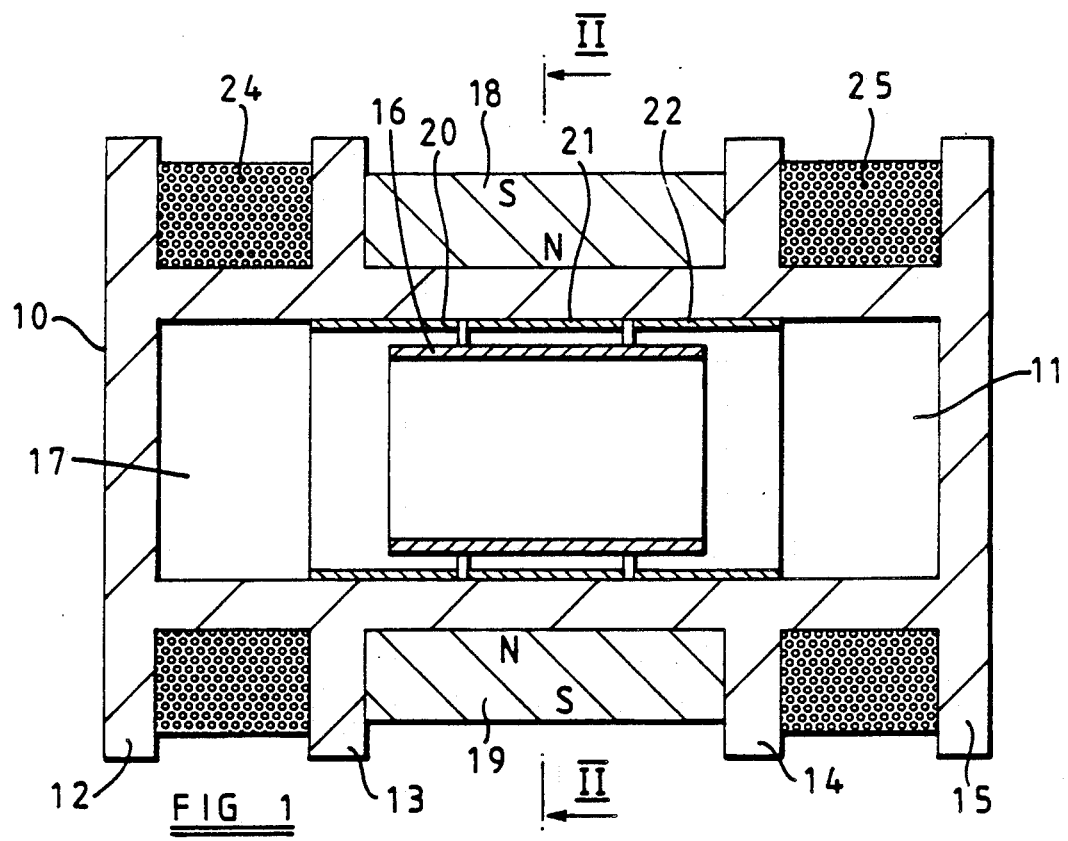
FIG. 1 is an axial section through the accelerometer taken along the line I—I in FIG. 2.
Figure 2:
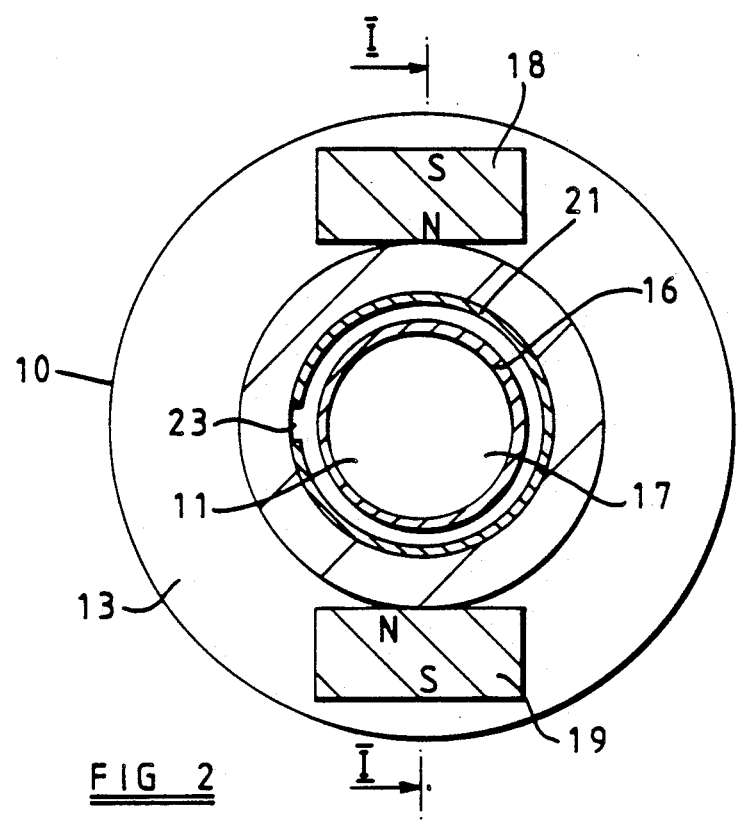
FIG. 2 is a cross-section through the accelerometer taken along the line II—II in FIG. 1.

Referring to FIGS. 1 and 2 the illustrated accelerometer comprises a non-metallic cylindrical housing 10 defining a cylindrical chamber 11 and formed with four spaced annular flanges 12, 13, 14 and 15. A proof mass 16 in the form of a hollow cylindrical electrically conductive tube, made for example of copper, is suspended by magnetizable fluid 17 within the chamber 11. The magnetizable fluid 17 is a ferrofluid comprising a colloidal suspension of very small ferromagnetic particles in a liquid, such as a synthetic hydrocarbon carrier.

As may be seen clearly in FIG. 2 two permanent magnets 18 and 19 are positioned between the annular flanges 13 and 14 on the housing 10 on opposite sides of the chamber 11 and symmetrically with respect to the central axis of the chamber 11. The magnets 18 and 19 are disposed with their North poles facing radially inward and their South poles facing radially outwards. Furthermore the magnets 18 and 19 magnetize the ferromagnetic particles within the fluid 17 in such a manner as to cause the particles to magnetically interact with one another and with the magnets 18 and 19 so as to center the proof mass 16 within the chamber 11 out of contact with the walls of the chamber 11. Thus the proof mass 16 is suspended within the chamber 11 in such a manner as to allow the proof mass to be displaced from its null position (shown in FIG. 1) along the central axis of the chamber 11 by an applied force.

Such movement is detected by a sensing arrangement comprising three electrodes 20, 21 and 22 axially spaced apart o the cylindrical wall of the chamber 11. As may be seen for the electrode 21 in FIG. 2, each electrode 20, 21 or 22 does not quite form a complete cylinder but is interrupted by an axial slot 23. This is done so as to ensure that induced currents are not caused to flow continuously around the electrodes. The electrodes 20, 21 and 22 are electrostatically coupled to the proof mass 16 so that the capacitance across adjacent electrodes varies in dependence on the extent to which the proof mass 16 overlaps the end electrodes 20 and 22. Thus, for example, if the proof mass 16 moves to the left, as shown in FIG. 1, the degree to which it overlaps the electrode 20 will increase, and hence the capacitance across the electrodes 20 and 21 will increase, whereas the degree to which the proof mass 16 overlaps the electrode 22 will decrease, and hence the capacitance across the electrodes 21 and 22 will decrease.

Two restoring coils 24 and 25 are wound on the housing 10 between the annular flanges 12 and 13 and the annular flanges 14 and 15 respectively. Each of these coils 24 and 25 when supplied with alternating current induces alternating current flow in the proof mass 16, which may be considered as a single turn coil, and as a result the proof mass 16 is repelled by the coil 24 or 25. In this manner the restoring coils 24 and 25 can serve to restore the proof mass 16 to its null position when the proof mass is displaced from the null position.

Figure 3:
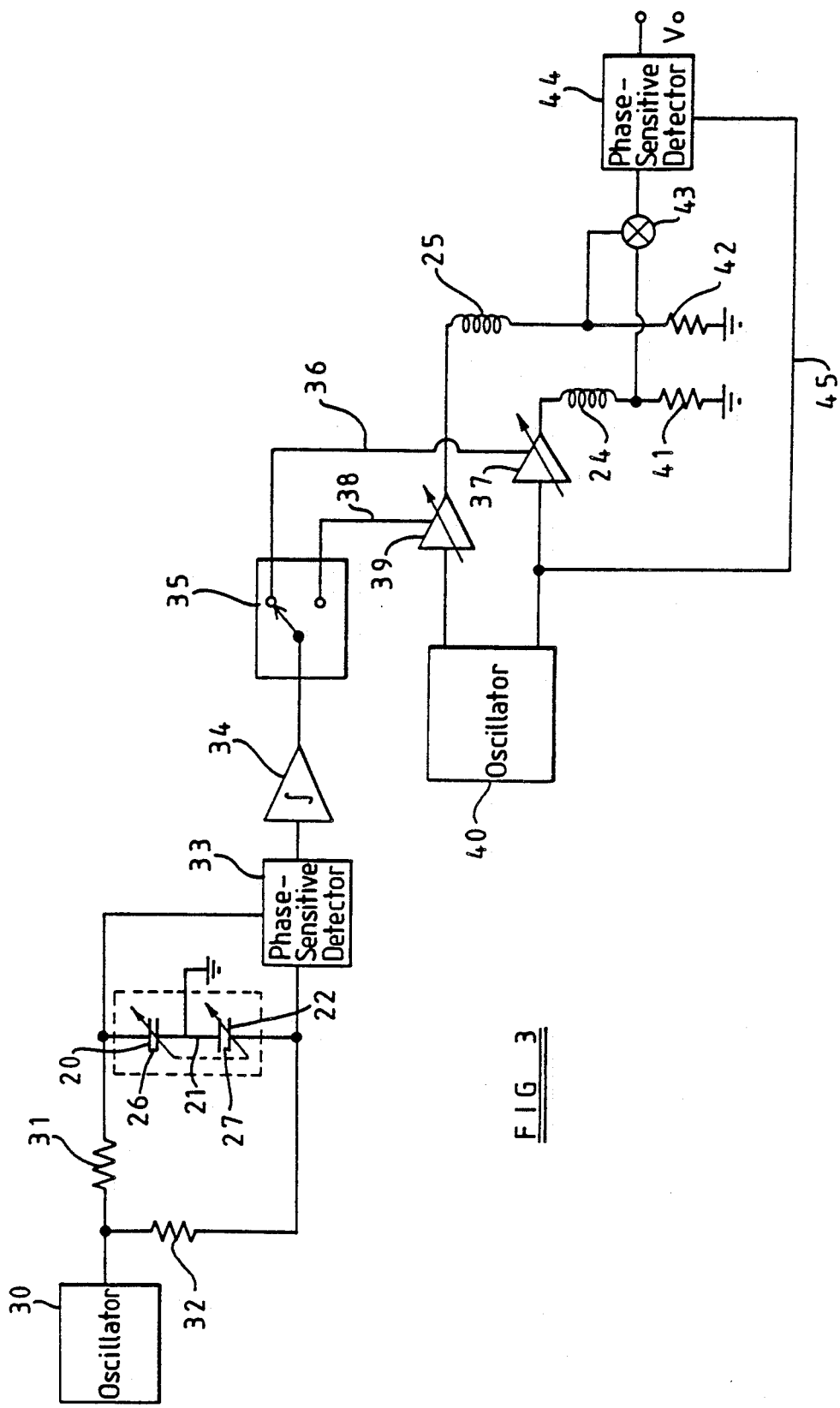
FIG. 3 is a block diagram of the control circuitry of the accelerometer.

The control circuitry of the accelerometer will now be described with reference to FIG. 3. As shown the electrodes 20, 21 and 22 in association with the proof mass 16 can be considered as constituting two variable capacitors 26 and 27 connected together and earthed at their common point. An oscillator 30 is connected to supply the capacitors 26 and 27 by way of resistors 31 and 32 respectively. A phase sensitive detector 33 detects the outputs from the capacitors 26 and 27 and provides a pulsed d.c. output voltage which is positive or negative depending on whether the output from the capacitor 26 leads or lags the output from the capacitor 27. Thus the polarity of the output from the phase-sensitive detector 33 depends on whether the proof mass 16 is displaced to the left or to the right in FIG. 1, and hence on whether the capacitance of the capacitor 26 is greater than or less than the capacitance of the capacitor 27.

An integrator 34 integrates the output from the phase-sensitve detector 33 and supplies an output voltage which is ramped in one direction when the pulsed input voltage is positive and which is ramped in the opposite direction when the pulsed input voltage is negative. A polarity switch 35 supplies the output voltage from the integrator 34 to a control line 36 of a variable gain amplifier 37 when the voltage is positive and to a control line 38 of a variable gain amplifier 9 when the voltage is negative.

An oscillator 40 supplies respective inputs which are 180° out-of-phase to the variable gain amplifiers 37 and 39 which in turn supply their outputs to the restoring coils 24 and 25 which are connected to earth by respective resistors 41 and 42. The magnitude of the alternating currents supplied to the coils 24 and 25 will vary in dependence on the gains applied by the amplifiers 37 and 39 which will depend on the voltages applied to the control lines 36 and 38. In this manner it can be arranged that, when the proof mass 16 is displaced from the null position in one direction, a net restoring force is exerted by the coils 24 and 25 to restore the proof mass 16 to its null position.

Furthermore the out-of-phase currents passing through the coils 24 and 25 are summed by an adder 43, and the summed output is supplied to a phase-sensitive detector 44 which is synchronized with the output of the oscillator 40 by a reference line 45. The output from the phase-sensitive detector 44 is a d.c. voltage $V_o$ which is proportional to the difference between the currents passing through the coils 24 and 25, and which accordingly is proportional to the applied force to be measured.

Since any displacement of the proof mass 16 due to an applied force is automatically compensated for by the application of a restoring force to the proof mass 16, only very small displacements of the proof mass 16 will be required in order to obtain an output from the accelerometer. This ensures substantially uniform response of the accelerometer over a wide range of applied force and high accuracy of measurement. Furthermore any thermal expansion of the magnetizable fluid 17 may be compensated for by forming at least one end wall of the chamber 11 with a flexible diaphragm.

I claim:

1. A linear accelerometer comprising a housing defining an elongate cylindrical chamber having a longitudinal axis and two ends, a magnetizable fluid within the chamber, an electrically conductive and substantially non-magnetic cylindrical proof mass which is coaxially disposed in the chamber in spaced relationship to the ends and which is displaceable in response to linear acceleration, magnet means outside the chamber for magnetizing the fluid to cause the proof mass to be suspended by the fluid away from the walls of the chamber while permitting displacement of the proof mass along the axis of the chamber, sensing means for detecting displacement of the proof mass from a null position along the axis of the chamber in response to the acceleration and providing an electrical output signal indicative of the applied force, and restoring coil means for applying a magnetic field to induce current flow in the proof mass and to cause the proof mass to be restored to its null position by interaction between the magnetic field and the induced current flow in response to detection of displacement of the proof mass.

2. An accelerometer according to claim 1, wherein the proof mass is an electrically conductive hollow cylinder which is open at both ends.

3. An accelerometer according to claim 2, wherein the cylinder is thin-walled and of circular cross-section.

4. An accelerometer according to claim 1, wherein the sensing means includes an electrode assembly attached to the wall of the chamber and comprising at least two electrodes spaced apart in the direction of the axis of the chamber and positioned such that the extent to which the electrodes are overlapped by the proof mass varies in dependence on the displacement of the proof mass from the null position.

5. An accelerometer according to claim 4, wherein each electrode has substantially the shape of a hollow cylinder but is prevented from forming a complete cylinder by the provision of an axial slot.

6. An accelerometer according to claim 4, wherein the sensing means further includes oscillator means for supplying an alternating input signal to the electrode assembly, and phase sensitive detector means for detecting variation of the phase of the output of the electrode assembly caused by displacement of the proof mass.

7. An accelerometer according to claim 1, wherein the restoring coil means comprises two coils coaxial with the displacement axis and wound on the housing so as to be symmetrically disposed on opposite sides of the null position.

8. An accelerometer according to claim 1, wherein the magnet means comprises permanent magnets disposed symmetrically with respect to the displacement axis.

* * * * *